United States Patent [19]
Bentley

[11] 3,773,425
[45] Nov. 20, 1973

[54] VISUAL COMPARATOR SYSTEM

[76] Inventor: Richard Paul Bentley, Box 786, Tupper Lake, N.Y. 12986

[22] Filed: Oct. 26, 1971

[21] Appl. No.: 167,956

[52] U.S. Cl.............. 356/191, 356/195, 356/243, 356/244
[51] Int. Cl............................................ G01j 3/52
[58] Field of Search............... 356/42, 191, 192, 356/193, 194, 195, 204, 212, 243, 244, 246

[56] References Cited
UNITED STATES PATENTS

| | | | |
|---|---|---|---|
| 2,007,087 | 7/1935 | Hird | 356/246 |
| 1,375,708 | 4/1921 | Klett | 356/246 |
| 2,684,010 | 7/1954 | Bulkley | 356/192 |
| 3,609,045 | 9/1971 | Stein | 356/243 |
| 1,647,569 | 11/1927 | Kaddatz | 356/194 |
| 1,859,278 | 5/1932 | Brice, Jr. | 356/42 |

Primary Examiner—David Schonberg
Assistant Examiner—V. P. McGraw
Attorney—Richard Paul Bentley

[57] ABSTRACT

The invention of the Visual Comparator System herein disclosed consists of two axially transparent and/or translucent samples, one of which is usually a reference sample and one a test sample, a sample holder to hold the samples in axial alignment, and a comparator card with a surface colored and/or shaded in a pattern dictated by the comparison being made. The comparator card is moveably held or mounted in such a way that light reflected from separate portions of its surface pass through the two samples to the operator's eye allowing a comparison based on color and/or optical density to be made.

3 Claims, 4 Drawing Figures

Fig. 2
Fig. 3
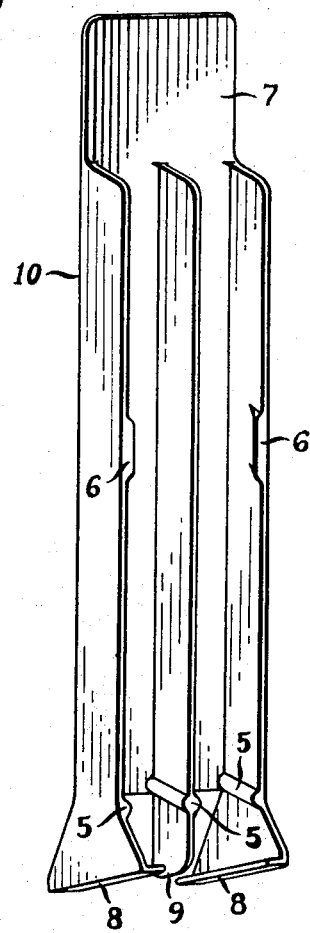
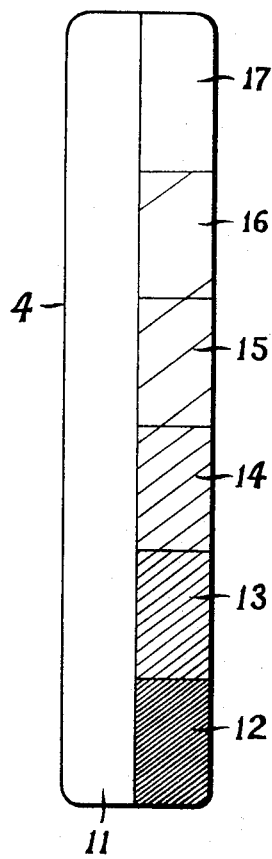
Fig. 4
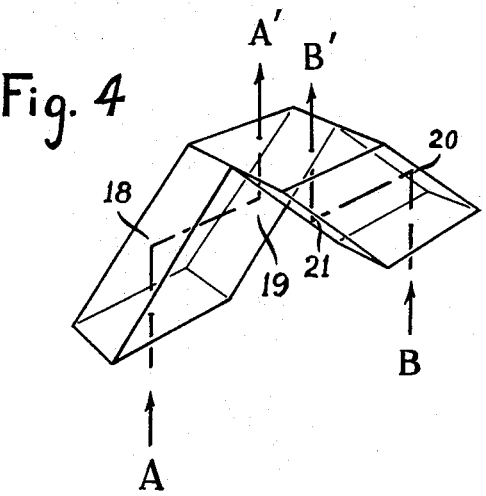

VISUAL COMPARATOR SYSTEM

The present invention relates to a new and useful method of visual comparison of transparent or translucent gases, liquids or solids on the basis of color and/or optical density.

The primary object of this invention is to provide a visual comparator simple to operate.

Another important object of this invention is to provide a visual comparator that is highly accurate with regard to enabling the operator to differentiate between different colors and/or optical densities of the materials being compared.

A further object of this invention is to provide a visual comparator that is simple in construction.

Yet another object of this invention is to provide a visual comparator that is versitile in its application to many different substances and measurements.

An understanding of this invention may be had from the following description, taken in connection with the accompanying drawings, in which:

FIG. 2 is a perspective view of another type of sample holder;

FIG. 3 is a top plan view of a typical comparator card such as would be used with the sample holder shown in FIG. 2; and FIG. 4 is an enlarged, perspective view of a comparator prism system with the light paths indicated by dashed lines.

Figure 1:
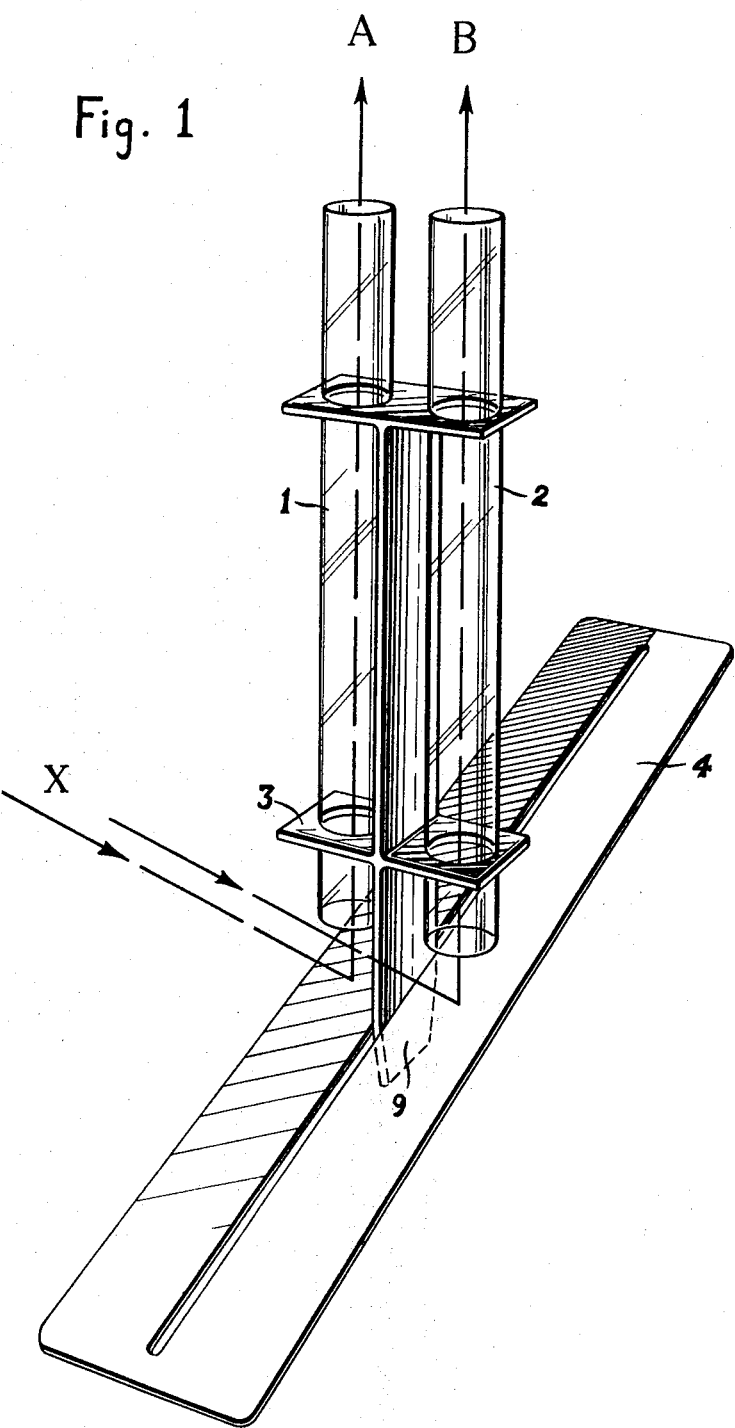
FIG. 1 is a perspective view of one type of sample holder with an appropriately designed comparator card and with light paths indicated by dashed lines and hidden parts indicated by dotted lines.

The Visual Comparator System consists basically of two samples 1 and 2, a sample holder 3 and a comparator card 4. The light path through the Visual Comparator is shown in FIG. 1. The light coming from a light source at X strikes comparator card 4 and is reflected upward through samples 1 and 2. The light emerges from the upper ends of samples 1 and 2 and is viewed by the operator at A and B.

The light source may be natural daylight, normal room lighting or any other convenient source.

Comparator card 4 is held at an angle relative to samples 1 and 2 either by hand as is shown in FIG. 1 or by the sample holder such as sample holder 10 in FIG. 2. The light is diffused as it is reflected off comparator card 4 so that the angle of comparator card 4 relative to samples 1 and 2 and to the light source is not critical, however, for convenience the angle should be between 100° and 135°. Comparator card 4 which may be constructed of cardboard, plastic, metal, or any other suitable material, consists of a surface held or movably mounted below samples 1 and 2 such that portion 11 of comparator card 4 moves directly below sample 1 and the portion consisting of sections 12 – 17 of comparator card 4 moves directly below sample 2. The two portions of comparator card 4 are usually colored or shaded such that portion 11 of the card is colored and/or shaded uniformly whereas the other portion contains variations in color and/or shading as dictated by the particular comparison being made.

FIG. 3 illustrates a design for a comparator card which meets the above conditions and which would be used with sample holder 10 shown in FIG. 2.

FIG. 1 illustrates a design for a hand held comparator card in which the comparator card has a slot through which separator 9 of sample holder 3 extends thus restricting the comparator card to movement along its length.

Numerical values of other information indicated by different positions of comparator card 4 relative to the sample holder may be contained on the front and/or back surface of comparator card 4, the only requirement being that the marking should not be placed so that it interferes with the light path.

Two samples are used in the Visual Comparator System so that except for color and/or optical density the two light paths are identical. Sample 1 is a reference sample while sample 2 is the test sample of which its properties of optical density and/or color are being compared with reference sample 1 and the difference is being measured. The shape of the samples is not critical except that the shape of both samples should be the same and the shape should be compatible with the design of the sample holder being used. A convenient shape is illustrated in FIG. 1 by samples 1 and 2. The cylindrical samples 1 and 2 may be solids, or they may be tubes with transparent ends containing either liquids or gases.

The sample holder which may be constructed of cardboard, plastic, metal, or other suitable material may take many different forms as illustrated by the two different forms shown in FIGS. 1 and 2. The only conditions that must be met in the design of a sample holder are that the samples must be held side-by-side such that the light paths through the samples are approximately parallel and adjacent, there should be an opaque separator 9 extending between the samples to the surface of comparator card 4 so that diffused light from the separate portions of the card does not enter the wrong sample, and the design should be compatible with the size and shape of the samples that will be used.

Sample holder 10 shown in FIG. 2 is a possible design for a sample holder that may be easily and inexpensively molded in plastic or constructed of various other materials. The important features of this design are as follows: Ridges 5 are stops to keep the samples in the proper vertical position. Raised portions 6 hold the samples in place. The extended top portion 7 acts as a shade to prevent stray light from interfering with the visual comparison. The extended edges 8 at the bottom hold comparator card 4 in the proper position relative to sample holder 10 and restrict comparator card 4 to movement along its length. The opaque center ridge 9 separates the samples and extends downward holding comparator card 4 against edges 8.

FIG. 4 shows an optional portion of the system that may be used when extreme precision is required. FIG. 4 is a prism system which is molded, cut, or assembled of transparent material arranged such that a portion of the light path from sample 1 passes upward through the prism system and is refracted twice by prism faces 18 and 19 such that it emerges at A'. An equivalent portion of the light path from sample 2 passes upward through the prism system and is refracted twice by prism faces 20 and 21 such that it emerges at B'.

A system of four mirrors arranged in the same positions as prism faces 18 – 21 could be used instead of a prism system.

The light paths emerging from the prism system at A' and B' are much closer together than the light paths emerging from samples 1 and 2 at A and B thus a visual comparison can be made with much greater accuracy.

While my invention is susceptible of embodiment in many different forms, a few of which I have shown in the figures and described in detail, the present disclosure is made with the understanding that it is to be considered as an exemplification of the principles of the invention and is not intended to limit the invention to the forms illustrated.

I claim:

1. In a Visual Comparator System a sample holder for holding two transparent or translucent samples of material to be compared on the basis of color and/or optical density, said samples being held by said holder approximately parallel and adjacent to each other and in an approximately upright position, and used in conjunction with a comparator card positioned at an angle beneath the sample holder such that light from an external source striking the comparator card is reflected, diffused, and modified as to color and intensity due to surface coloration of the comparator card, said diffused light from that selected portion of the comparator card positioned directly below the two samples passing upward through the samples to the operator's eye, said sample holder incorporating an opaque separator between the samples and extending below the samples to the surface of the comparator card, with means provided by a portion of the sample holder and comparator card to constrain the movement of the comparator card such that one portion of said comparator card is constrained to movement beneath one sample while, simultaneously another separate portion of said comparator card is constrained to movement beneath the other sample, said comparator card being either hand held or movably attached to the bottom of the sample holder.

2. In a Visual Comparator System a sample holder for holding two transparent or translucent samples of material to be compared on the basis of color and/or optical density, said samples being held by said holder approximately parallel and adjacent to each other and in an approximately upright position, and used in conjunction with a comparator card positioned at an angle beneath the sample holder such that light from an external source striking the comparator card is reflected, diffused, and modified as to color and intensity due to surface coloration of the comparator card, said diffused light from that selected portion of the comparator card positioned directly below the two samples passing upward through the samples to the operator's eye, said sample holder incorporating an opaque separator between the samples and extending below the samples to the surface of the comparator card, with means provided by a portion of the sample holder consisting of two downwardly extending sections, one from each side of the sample holder, terminating in edges inclined downward from rear to front, for the purpose of supporting and restricting the movement of the comparator card to motion parallel to said edges, this restricted movement having the effect of constraining one side of the comparator card to movement beneath the sample on the corresponding side of the sample holder while, simultaneously the other side of the comparator is card constrained to movement beneath the other sample, and including on the top front edge of said sample holder a vertically extended portion which acts to prevent stray light from interfering with accurate use of the Visual Comparator System.

3. In a Visual Comparator System a comparator card to be used in conjunction with a sample holder and two samples, one of which is a reference sample and the other a test sample of unknown light transmission characteristics, said comparator card constructed such that, when used with said sample holder, one portion of the comparator card surface is constrained to movement beneath one sample whereas another portion of the comparator card surface is constrained to movement beneath the other sample, and on which the portion beneath the test sample is usually colored and shaded uniformly, whereas the portion beneath the reference sample is colored and shaded in discrete segments or with an arrangement of continuous color and shape variation, such colors and shades being determined by the particular comparison for which a particular card is designed, and on either or both sides of which may be marks, numerical values, or other information indicated by different positions of the comparator card relative to the sample holder.

* * * * *